(12) United States Patent
Story et al.

(10) Patent No.: US 12,565,144 B2
(45) Date of Patent: Mar. 3, 2026

(54) SYSTEMS AND METHODS FOR PROVIDING IMMEDIATE POST-EVENT DRIVER ALERTS

(71) Applicant: STEERING SOLUTIONS IP HOLDING CORPORATION, Saginaw, MI (US)

(72) Inventors: Michael R. Story, Bay City, MI (US); Andrew J. Frank, Rochester Hills, MI (US); William D. Bodeis, Saginaw, MI (US); Peter D. Schmitt, Farmington Hills, MI (US); Joachim J. Klesing, Rochester, MI (US); Sayedmohammad Hosseini, Royal Oak, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 185 days.

(21) Appl. No.: 18/477,826

(22) Filed: Sep. 29, 2023

(65) Prior Publication Data

US 2024/0109487 A1 Apr. 4, 2024

Related U.S. Application Data

(60) Provisional application No. 63/411,669, filed on Sep. 30, 2022.

(51) Int. Cl.
*B60Q 9/00* (2006.01)
(52) U.S. Cl.
CPC .................................... *B60Q 9/00* (2013.01)

(58) Field of Classification Search
CPC ....................................................... B60Q 9/00
See application file for complete search history.

(56) References Cited

U.S. PATENT DOCUMENTS

| | | | | |
|---|---|---|---|---|
| 9,626,763 B1 * | 4/2017 | Hoye | ...................... | B60R 11/04 |
| 11,396,152 B1 * | 7/2022 | Roy | ........................ | B29C 64/20 |
| 2010/0174576 A1 * | 7/2010 | Naylor | ..................... | G07C 5/00 |
| | | | | 706/54 |
| 2010/0211249 A1 * | 8/2010 | McClellan | ............. | G07C 5/085 |
| | | | | 701/31.4 |
| 2015/0046084 A1 * | 2/2015 | Choi | .................. | G01C 21/3697 |
| | | | | 701/468 |
| 2020/0103905 A1 * | 4/2020 | Gurin | ................... | G06Q 10/083 |
| 2020/0262438 A1 * | 8/2020 | Bai | ...................... | G08G 1/0112 |

(Continued)

*Primary Examiner* — Naeem Taslim Alam
(74) *Attorney, Agent, or Firm* — Dickinson Wright PLLC

(57) ABSTRACT

A method for providing a post-event alert includes receiving sensor data, detecting, based on the sensor data, at least one vehicle event, and determining a severity value associated with the at least one vehicle event. The method also includes determining whether the severity value is greater than a severity threshold and, in response to a determination that the severity value is greater than the severity threshold, identifying at least one aspect of a vehicle that is potentially damaged. The method also includes determining a potential damage value associated with the at least one aspect of the vehicle that is potentially damaged, determining whether the potential damage value is greater than a potential damage threshold, and, in response to determining that the potential damage value is greater than the potential damage threshold, generating an alert indicating at least the at least one aspect of the vehicle that is potentially damaged.

18 Claims, 6 Drawing Sheets

(56)                References Cited

U.S. PATENT DOCUMENTS

| | | | |
|---|---|---|---|
| 2021/0197846 A1* | 7/2021 | Thakur | B60Q 1/545 |
| 2021/0318121 A1* | 10/2021 | Laroche | G01C 11/025 |
| 2022/0044034 A1* | 2/2022 | RoyChowdhury | E01C 23/01 |
| 2022/0332362 A1* | 10/2022 | Watanabe | B62D 5/0484 |
| 2023/0061054 A1* | 3/2023 | Abbaspour | G07C 5/0816 |
| 2023/0096556 A1* | 3/2023 | Lerner | H04W 84/18 |
| | | | 455/456.1 |
| 2023/0298460 A1* | 9/2023 | Cui | G08G 1/0145 |
| | | | 701/118 |
| 2023/0377456 A1* | 11/2023 | Paschall | G06V 10/774 |

* cited by examiner

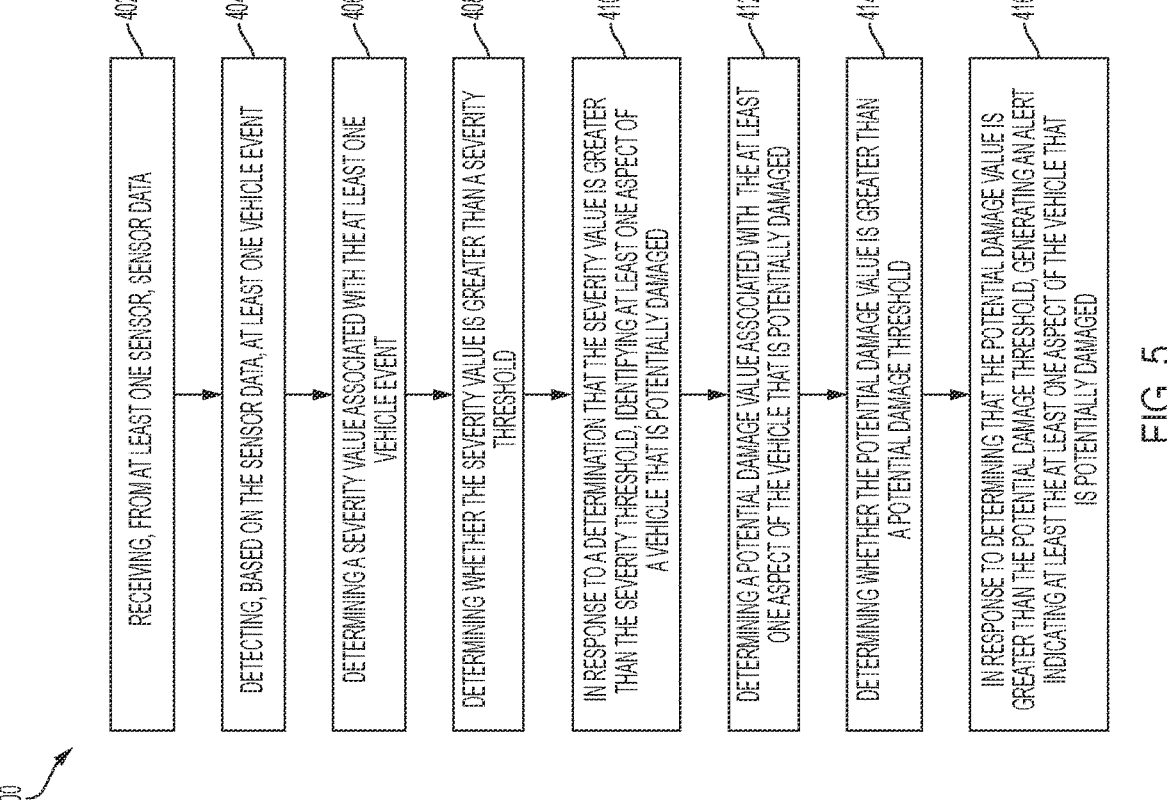

400

402 — RECEIVING, FROM AT LEAST ONE SENSOR, SENSOR DATA

404 — DETECTING, BASED ON THE SENSOR DATA, AT LEAST ONE VEHICLE EVENT

406 — DETERMINING A SEVERITY VALUE ASSOCIATED WITH THE AT LEAST ONE VEHICLE EVENT

408 — DETERMINING WHETHER THE SEVERITY VALUE IS GREATER THAN A SEVERITY THRESHOLD

410 — IN RESPONSE TO A DETERMINATION THAT THE SEVERITY VALUE IS GREATER THAN THE SEVERITY THRESHOLD, IDENTIFYING AT LEAST ONE ASPECT OF A VEHICLE THAT IS POTENTIALLY DAMAGED

412 — DETERMINING A POTENTIAL DAMAGE VALUE ASSOCIATED WITH THE AT LEAST ONE ASPECT OF THE VEHICLE THAT IS POTENTIALLY DAMAGED

414 — DETERMINING WHETHER THE POTENTIAL DAMAGE VALUE IS GREATER THAN A POTENTIAL DAMAGE THRESHOLD

416 — IN RESPONSE TO DETERMINING THAT THE POTENTIAL DAMAGE VALUE IS GREATER THAN THE POTENTIAL DAMAGE THRESHOLD, GENERATING AN ALERT INDICATING AT LEAST THE AT LEAST ONE ASPECT OF THE VEHICLE THAT IS POTENTIALLY DAMAGED

FIG. 5

SYSTEMS AND METHODS FOR PROVIDING IMMEDIATE POST-EVENT DRIVER ALERTS

CROSS-REFERENCES TO RELATED APPLICATIONS

This U.S. patent application claims the benefit and priority to U.S. Patent Provisional Application Ser. No. 63/411,669, filed Sep. 30, 2022, the entire disclosure of which is hereby incorporated by reference.

TECHNICAL FIELD

This disclosure related to vehicle event detection, and in particular to systems and methods for providing immediate post-event driver alerts.

BACKGROUND

Vehicles, such as cars, trucks, sport utility vehicles, crossovers, mini-vans, marine craft, aircraft, all-terrain vehicles, recreational vehicles, or other suitable vehicles, include a various systems, such as a steering system (e.g., such as an electronic power steering (EPS) system, a steer-by-wire (SbW) steering system, a hydraulic steering system, or other suitable steering system), suspension system, propulsion system, and the like. Components of such systems are subject to general wear and tear. As operating conditions for one vehicle may vary from those of another vehicle, component life (e.g., the length of time a component can function before experiencing undesirable operating characteristics) may vary from vehicle to vehicle.

SUMMARY

This disclosure relates generally to vehicle event detection and alerts.

An aspect of the disclosed embodiments includes a method for providing a post-event alert. The method includes receiving, from at least one sensor, sensor data, detecting, based on the sensor data, at least one vehicle event, and determining a severity value associated with the at least one vehicle event. The method also includes determining whether the severity value is greater than a severity threshold and, in response to a determination that the severity value is greater than the severity threshold, identifying at least one aspect of a vehicle that is potentially damaged. The method also includes determining a potential damage value associated with the at least one aspect of the vehicle that is potentially damaged, determining whether the potential damage value is greater than a potential damage threshold, and, in response to determining that the potential damage value is greater than the potential damage threshold, generating an alert indicating at least the at least one aspect of the vehicle that is potentially damaged.

Another aspect of the disclosed embodiments includes a system for providing a post-event alert. The system includes a processor and a memory. The memory includes instructions that, when executed by the processor, cause the processor to: receive, from at least one sensor, sensor data; detect, based on the sensor data, at least one vehicle event; determine a severity value associated with the at least one vehicle event; determine whether the severity value is greater than a severity threshold; in response to a determination that the severity value is greater than the severity threshold, identify at least one aspect of a vehicle that is potentially damaged; determine a potential damage value associated with the at least one aspect of the vehicle that is potentially damaged; determine whether the potential damage value is greater than a potential damage threshold; and, in response to determining that the potential damage value is greater than the potential damage threshold, generate an alert indicating at least the at least one aspect of the vehicle that is potentially damaged.

Another aspect of the disclosed embodiments includes an apparatus for providing a post-event alert. The apparatus includes a processor, and a memory. The memory includes instructions that, when executed by the processor, cause the processor to: detect, based on sensor data, at least one vehicle event; determine a severity value associated with the at least one vehicle event; determine whether the severity value is greater than a severity threshold; in response to a determination that the severity value is greater than the severity threshold, identify at least one aspect of a vehicle that affected by the at least one vehicle event; determine a value associated with the at least one aspect of the vehicle that is affected by the at least one vehicle event; determine whether the value is greater than a value threshold; in response to determining that the value is greater than the value threshold, generate an alert indicating at least the at least one aspect of the vehicle that is affected by the at least one vehicle event; and provide the alert.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 5 is a flow diagram generally illustrating an alternative post-event alert method according to the principles of the present disclosure.

DETAILED DESCRIPTION

Figure 1:
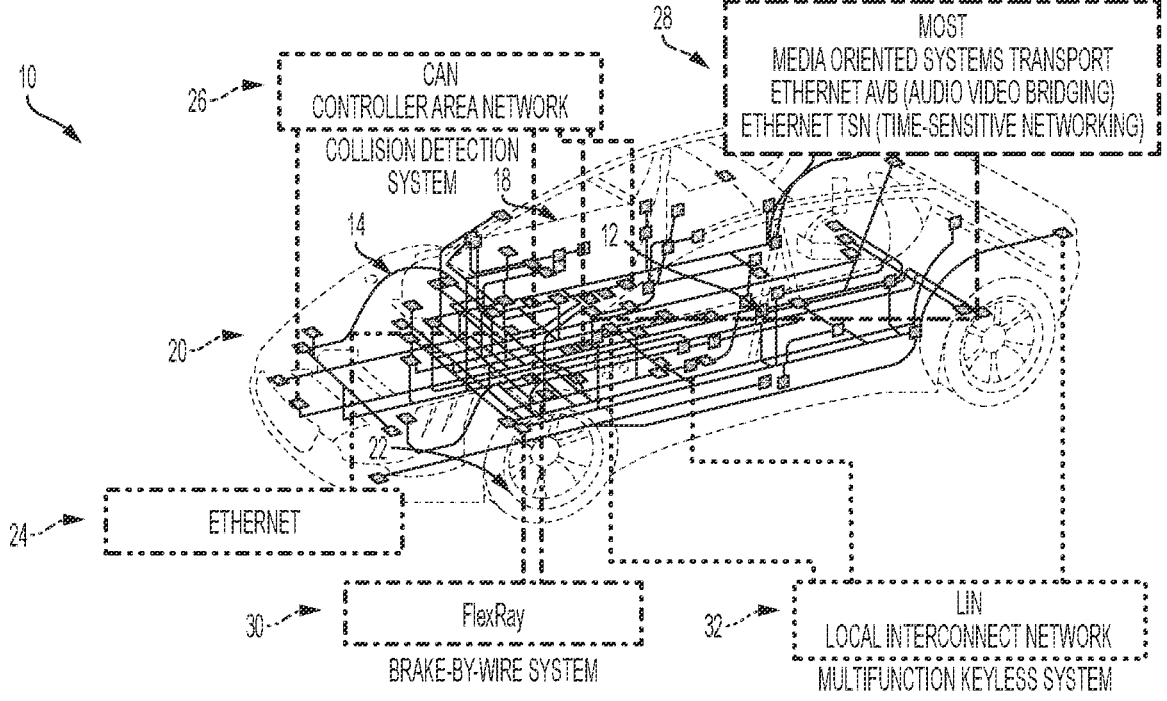
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, include a various systems, such as a steering system (e.g., such as an electronic power steering (EPS) system, a steer-by-wire (SbW) steering system, a hydraulic steering system, or other suitable steering system), suspension system, propulsion system, and the like. Components of such systems are subject to general wear and tear. As operating conditions for one vehicle may vary from those of another vehicle, component life (e.g., the length of time a component can function before experiencing undesirable operating characteristics) may vary from vehicle to vehicle.

Additionally, as every operator, autonomous controller, and/or semi-autonomous controller operate the in various and differing manners (e.g., including different driving styles, operating on different road surfaces, and the like), various factors associated with vehicle operation (e.g., and variation in vehicle operation) contribute to component wear and life variance for such operators, autonomous controllers, and/or semi-autonomous controllers.

Typically, a user or individual associated with the vehicle (e.g., including the operator of the vehicle, the owner of the vehicle, and the like) may not be aware of a problem associated with the vehicle until there is noticeable damage or a noticeable change in vehicle operation. However, various events may occur (e.g., such as hitting a curb with the vehicle, traversing a pothole or damaged road with the vehicle, and the like) that may result in damage that is not be noticeable to the individual associated with the vehicle until, over time, the damage becomes more apparent or noticeable, which may result in a more costly and/or more significant repair (e.g., than had the damage been addressed before the damage became more apparent or noticeable).

Accordingly, systems and methods, such as those described herein, configured to generate immediate post-event driver alerts, may be desirable. In some embodiments, the systems and methods described herein may be configured to provide an immediate post-event alert (e.g., to the operator of the vehicle, the owner of the vehicle, and/or other individual associated with the vehicle). The systems and methods described herein may be configured to warn the individual immediately after an event that has been calculated to cause damage, which may allow the individual to have the vehicle inspected before any long-term or significant damage occurs. For example, the systems and methods described herein may be configured to detect road surface events, such as the vehicle hitting a pothole that has enough severity to cause damage.

The systems and methods described herein may be configured to alert the individual associated with the vehicle via a message or indicator on a display within the vehicle, via an electronic mail message, via a mobile computing device, via any other suitable computing device, or via any suitable means. The systems and methods described herein may be configured to suggest or recommend, via the alert, that the individual associated with the vehicle have a calculated area of damage inspected prior to such damage becoming more severe (e.g., and resulting in a more costly or significant repair and/or an unsafe vehicle operating condition).

In some embodiments, the systems and methods described herein may be configured to provide a pre-prognostic post-event alert. The systems and methods described herein may be configured to provide immediate feedback based on the detected severity of an event. The systems and methods described herein may be configured to calculate damage areas based on the event. The systems and methods described herein may be configured to provide the post-event alert based on vehicle data, surface data (e.g., or a surface being traversed by the vehicle), or other suitable data.

In some embodiments, the systems and methods described herein may be configured to receive, from at least one sensor, sensor data. The systems and methods described herein may be configured to detect, based on the sensor data, at least one vehicle event. The at least one vehicle event may be associated with at least one of a pothole, a road bump, a gravel spill, a bridge joint, an access cover, an asphalt crack, and/or other suitable aspects of the road or surface being traversed by the vehicle. For example, the at least one vehicle event may include the vehicle hitting a pothole.

The systems and methods described herein may be configured to determine a severity value associated with the at least one vehicle event. The systems and methods described herein may be configured to determine whether the severity value is greater than a severity threshold. The systems and methods described herein may be configured to, in response to a determination that the severity value is greater than the severity threshold, identify at least one aspect of a vehicle that is potentially damaged. The systems and methods described herein may be configured to determine a potential damage value associated with the at least one aspect of the vehicle that is potentially damaged.

The systems and methods described herein may be configured to determine whether the potential damage value is greater than a potential damage threshold. The systems and methods described herein may be configured to, in response to determining that the potential damage value is greater than the potential damage threshold, generate an alert indicating at least the at least one aspect of the vehicle that is potentially damaged.

The systems and methods described herein may be configured to provide, to at least one individual associated with the vehicle, the alert. The systems and methods described herein may be configured to at least one of provide the alert to a display associated with the vehicle, provide the alert to an electronic mail address associated with the at least one individual associated with the vehicle, provide the alert to at least one mobile computing device and/or other suitable computing device.

In some embodiments, the systems and methods described herein may be configured to store, in a database, data associated with the at least one vehicle event. The systems and methods described herein may be configured to determine, based on data stored in the database, whether a number of vehicle events having characteristics that are similar to the at least one vehicle event is greater than a vehicle event threshold. The systems and methods described herein may be configured to, in response to a determination that the number of vehicle events having characteristics that are similar to the at least one vehicle event is greater than the vehicle event threshold, initiate at least one corrective action. The at least one corrective action may include at least one of generating an alternative alert, providing the alert and/or the alternative alert to an alternative device (e.g., such as a computing device associated with an owner of the vehicle, who may not be the operator of the vehicle, a computing device associated with a vehicle repair facility, and the like), any other suitable corrective action, or a combination thereof.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
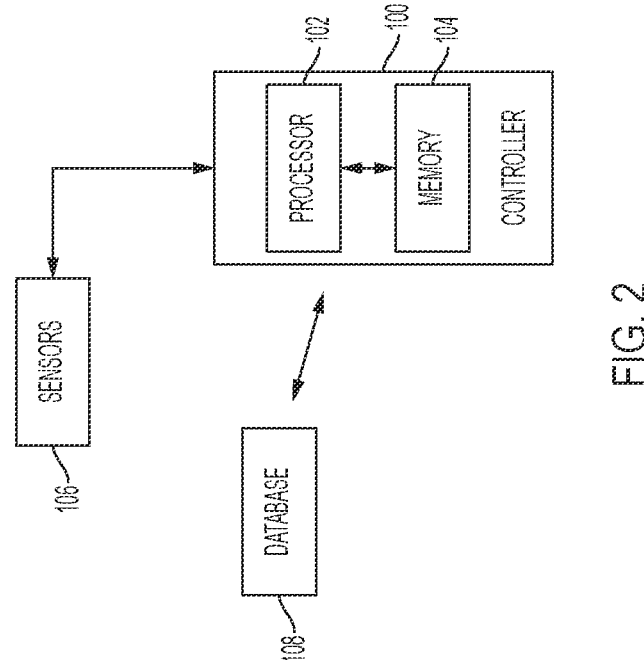
FIG. 2 generally illustrates a vehicle controller according to the principles of the present disclosure.

In some embodiments, the steering system may include a controller, such as controller 100, as is generally illustrated in FIG. 2. The controller 100 may include any suitable controller. The controller 100 may be configured to control, for example, the various functions of the vehicle systems described herein. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system and/or any other suitable function, including those of the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more motor angle sensors or devices, other suitable sensors or devices, or a combination thereof. The one or more signals may indicate a handwheel torque, a handwheel angel, a motor angle or motor position, a vehicle speed, other suitable information, or a combination thereof.

In some embodiments, the controller 100 may be in communication with a database 108. The database 108 may include any suitable database or storage mechanism and be configured to receive various queries using any suitable database language other suitable query language. The database 108 may be disposed within the vehicle 10 and/or remotely located from the vehicle 10 (e.g., such as on a distributed computing network or system).

In some embodiment, the controller 100 may be configured to provide one or more post-event alerts. For example, the controller 100 may receive, from at least one sensor 106, sensor data. The sensor data may include any suitable sensor data, including those described herein, and/or road surface data, vehicle impact data, and the like.

The controller 100 may detect, based on the sensor data, at least one vehicle event. The at least one vehicle event may be associated with at least one of a pothole, a road bump, a gravel spill, a bridge joint, an access cover, an asphalt crack, and/or other suitable aspects of the road or surface being traversed by the vehicle. For example, the at least one vehicle event may include the vehicle 10 hitting a pothole.

The controller 100 may determine a severity value associated with the at least one vehicle event. The controller 100 may determine whether the severity value is greater than a severity threshold. The controller 100 may, in response to a determination that the severity value is greater than the severity threshold, identify at least one aspect of a vehicle that is potentially damaged. Alternatively, the controller 100 may, in response to a determination that the severity value is not greater than the severity threshold, continue to monitor various vehicle events and store, in the database 108 or other suitable location, data associated with the vehicle event (e.g., including an event type, the severity value, characteristics of the sensor data, and/or the like).

The controller 100 may determine a potential damage value associated with the at least one aspect of the vehicle 10 that is potentially damaged. The controller 100 may determine whether the potential damage value is greater than a potential damage threshold. The controller 100 may, in response to determining that the potential damage value is greater than the potential damage threshold, generate an alert indicating at least the at least one aspect of the vehicle that is potentially damaged.

Alternatively, the controller 100 may, in response to a determination that the potential damage value is not greater than the potential damage threshold, continue to monitor various vehicle events and store, in the database 108 or other suitable location, data associated with the vehicle event (e.g., including an event type, the severity value, the potential damage value, characteristics of the sensor data, and/or the like).

The controller 100 may provide, to at least one individual associated with the vehicle 10, the alert. The controller 100 may at least one of provide the alert to a display associated with the vehicle 10, provide the alert to an electronic mail address associated with the at least one individual associated with the vehicle 10, provide the alert to at least one mobile computing device and/or other suitable computing device.

In some embodiments, the controller 100 may store, in the database 108 or other suitable location, data associated with the at least one vehicle event (e.g., including an event type, the severity value, the potential damage value, characteristics of the sensor data, the alert, and/or the like). The controller 100 may determine, based on data stored in the database, whether a number of vehicle events having characteristics that are similar to the at least one vehicle event is greater than a vehicle event threshold. The controller 100 may, in response to a determination that the number of vehicle events having characteristics that are similar to the at least one vehicle event is greater than the vehicle event threshold, initiate at least one corrective action. The at least one corrective action may include at least one of generating an alternative alert, providing the alert and/or the alternative alert to an alternative device (e.g., such as a computing device associated with an owner of the vehicle 10, who may not be the operator of the vehicle 10, a computing device associated with a vehicle repair facility, and the like), any other suitable corrective action, or a combination thereof.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 3:
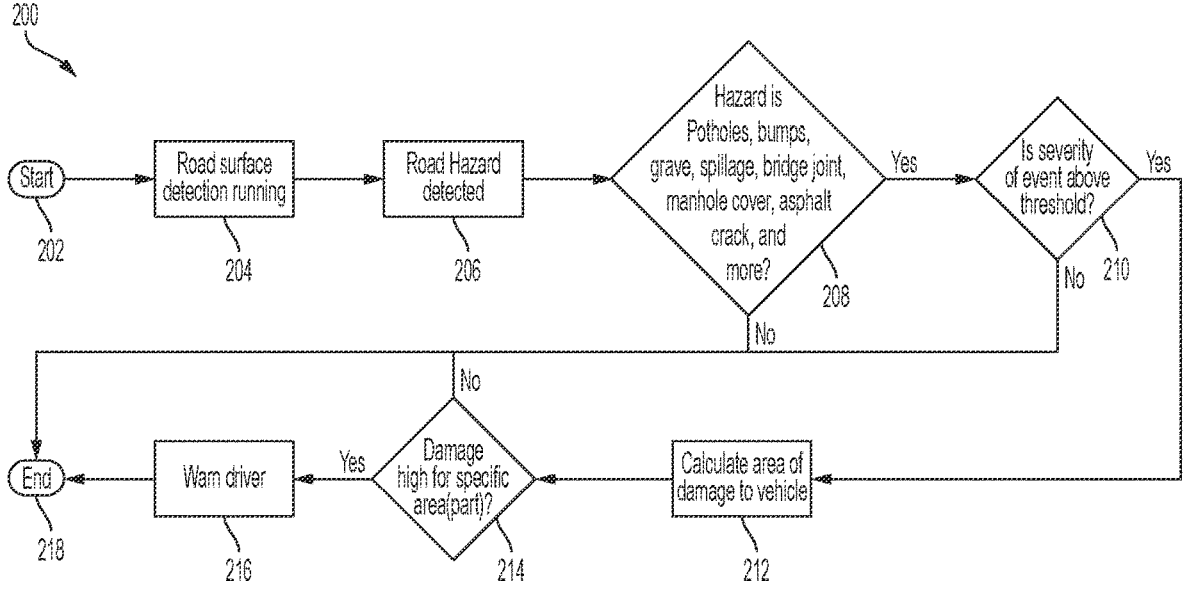
FIG. 3 is a flow diagram generally illustrating a post-event alert method according to the principles of the present disclosure.

FIG. 3 is a flow diagram generally illustrated a post-event alert method 200 according to the principles of the present disclosure. At 202, the method 200 begins.

At 204, the method 200 initiates a road surface detection process. For example, the controller 100 may initiate the road surface detection process, which may cause the controller 100 to perform steps associated with the method 200.

At 206, the method 200 detects a road hazard. For example, the controller 100 may detect the road hazard.

At 208, the method 200 determines whether the road hazard is associated with at least one of a pothole, bump, gravel spillage, bridge joint, manhole (e.g., or access) cover, asphalt crack, and/or the like. For example, the controller 100 may determine whether the road hazard is associated with at least one of a pothole, bump, gravel spillage, bridge joint, manhole (e.g., or access) cover, asphalt crack, and/or the like. If the controller 100 determines that the road hazard is associated with at least one of a pothole, bump, gravel spillage, bridge joint, manhole (e.g., or access) cover, asphalt crack, and/or the like, the method 200 continues at 210. Alternatively, if the controller 100 determines that the road hazard is not associated with at least one of a pothole, bump, gravel spillage, bridge joint, manhole (e.g., or access) cover, asphalt crack, and/or the like, the method 200 continues at 218.

At 210, the method 200 determines whether a severity of an event is above a threshold. For example, the controller 100 may determine whether the severity of the event is greater than the threshold. If the controller 100 determines that the severity of the event is greater than the threshold, the method 200 continues at 212. Alternatively, if the controller 100 determines that the severity of the event is not greater than the threshold, the method continues at 218.

At 212, the method 200 calculates an area of damage to a vehicle. For example, the controller 100 may calculate the area of damage to the vehicle 10.

At 214, the method 200 determines whether the damage is high for a specified area (or part). For example, the controller 100 may determine whether the damage is relatively high (e.g., greater than a threshold) for the specified area (or part). If the controller 100 determines that the damage is relatively high (e.g., greater than a threshold) for the specified area (or part), the method continues at 216. Alternatively, if the controller 100 determines that the damage is not relatively high (e.g., not greater than a threshold) for the specified area (or part), the method continues at 218.

At 216, the method 200 warns a drive. For example, the controller 100 warns the operator of the vehicle 10.

At 218, the method 200 ends.

Figure 4:
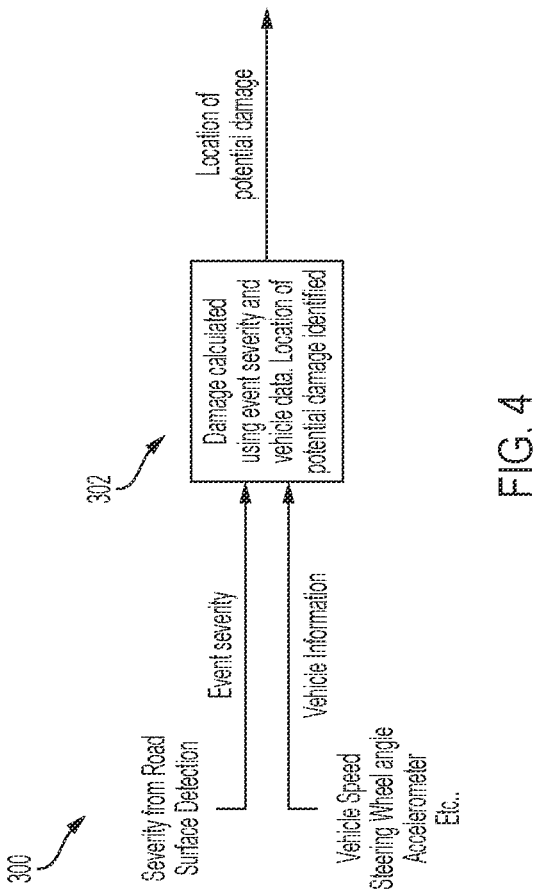
FIG. 4 is a flow diagram generally illustrating an alternative post event alert method according to the principles of the present disclosure.

FIG. 4 generally illustrates an alternative post-event alert method 300 according to the principles of the present disclosure. At 302, the method 300 calculates damage using event severity and vehicle data and identifies potential damage. For example, the controller 100 may use event severity (e.g., which may be determined, by the controller 100, based on a severity associated with a detected road surface) and vehicle information (e.g., which may be determined, by the controller 100 using vehicle speed, steering wheel angle, accelerometer data, and/or the like) to calculate damage and/or identify potential damage to the vehicle 10. The controller 100 may output an indication of the location of the potential damage.

FIG. 5 is a flow diagram generally illustrating an alternative post-event alert method 400 according to the principles of the present disclosure. At 402, the method 400 receives, from at least one sensor, sensor data. For example, the controller 100 may receive, from at least one sensor 106, the sensor data.

At 404, the method 400 detects, based on the sensor data, at least one vehicle event. For example, the controller 100 may detect, based on the sensor data, the at least one vehicle event.

At 406, the method 400 determine a severity value associated with the at least one vehicle event. For example, the controller 100 may determine the severity value associated with the at least one vehicle event.

At 408, the method 400 determines whether the severity value is greater than a severity threshold. For example, the controller 100 may determine whether the severity value is greater than the severity threshold.

At 410, the method 400, in response to a determination that the severity value is greater than the severity threshold, identifies at least one aspect of a vehicle that is potentially damaged. For example, the controller 100 may, in response to a determination that the severity value is greater than the severity threshold, identify the at least one aspect of the vehicle that is potentially damaged.

At 412, the method 400 determines a potential damage value associated with the at least one aspect of the vehicle that is potentially damaged. For example, the controller 100 may determine the potential damage value associated with the at least one aspect of the vehicle 10 that is potentially damaged.

At 414, the method 400 determines whether the potential damage value is greater than a potential damage threshold. For example, the controller 100 may determine whether the potential damage value is greater than the potential damage threshold.

At 416, the method 400, in response to determining that the potential damage value is greater than the potential damage threshold, generates an alert indicating at least the at least one aspect of the vehicle that is potentially damaged. For example, the controller 100 may, in response to determining that the potential damage value is greater than the potential damage threshold, generate the alert indicating at least the at least one aspect of the vehicle 10 that is potentially damaged.

Figure 6:
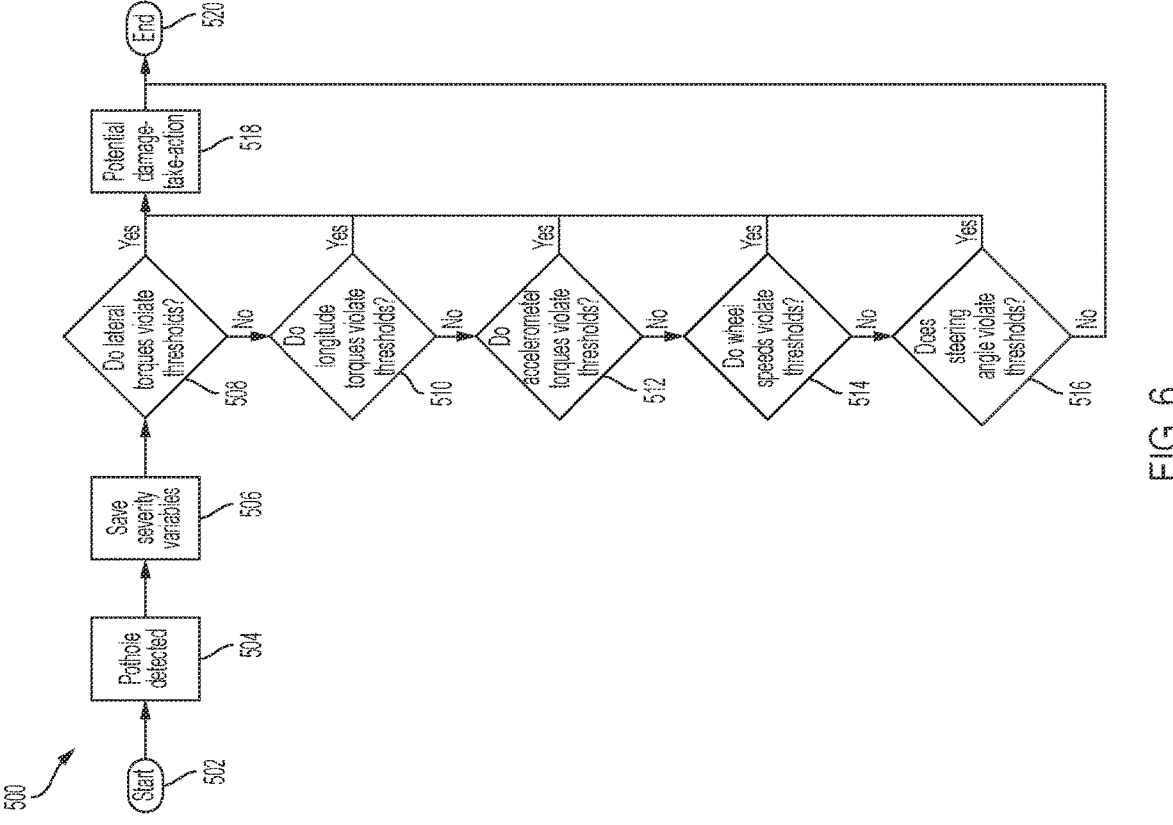
FIG. 6 is a flow diagram generally illustrating an alternative post-event alert method according to the principles of the present disclosure.

FIG. 6 is a flow diagram generally illustrating an alternative post-event alert method 500 according to the principles of the present disclosure. At 502, the method 500 begins.

At 504, the method 500 detects at least one pothole using vehicle data and road surface software For example, the controller 100 may detect the at least one pothole using vehicle data and road surface information (e.g., including, but not limited to, the information described herein).

At 506, the method 500 saves, in memory, severity variables at a time of the event (e.g., the contact with the pothole by the vehicle 10). For example, the controller 100 may save severity variables associated with the event, at the time of the event. The controller 100 may compare these values to known limits for cause of damage derived from historical data. The controller 100 may compare values directly and/or use the values in a calculation (e.g., which may include a derived calculation or machine learning, and may be calculated or determined locally, or the data sent to the cloud or other suitable remotely located computing system, and processed).

For example, at 508, the method 500 determines whether one or more lateral torque values violate a threshold. For example, the controller 100 may determine whether the one or more lateral torque values (e.g., lateral torque values associated with lateral torque at one or more wheels of the vehicle 10) violate the threshold. If the controller 100 determines that the one or more lateral torque values violate the threshold, the method 500 continues at 518. Alternatively, if the controller 100 determines that the one or more lateral torque values do not violate the threshold, the method 500 continues at 510.

At 510, the method 500 determines whether one or more longitude torque values violate a threshold. For example, the controller 100 may determine whether the one or more longitude torque values (e.g., longitude torque values associated with lateral torque at one or more wheels of the vehicle 10) violate the threshold. If the controller 100 determines that the one or more longitude torque values violate the threshold, the method 500 continues at 518. Alternatively, if the controller 100 determines that the one or more longitude torque values do not violate the threshold, the method 500 continues at 512.

At 512, the method 500 determines whether one or more accelerometer values violate a threshold. For example, the controller 100 may determine whether the one or more accelerometer values violate the threshold. If the controller 100 determines that the one or more accelerometer values violate the threshold, the method 500 continues at 518. Alternatively, if the controller 100 determines that the one or more accelerometer values do not violate the threshold, the method 500 continues at 514.

At 514, the method 500 determines whether a change in one or more wheel speed values violate a threshold. For example, the controller 100 may determine whether the change in one or more wheel speed values violate the threshold. If the controller 100 determines that the change in one or more wheel speed values violate the threshold, the method 500 continues at 518. Alternatively, if the controller 100 determines that the change in one or more wheel speed values do not violate the threshold, the method 500 continues at 516.

At 516, the method 500 determines whether a change in one or more wheel angle values violate a threshold. For example, the controller 100 may determine whether the change in one or more wheel angle values violate the threshold. If the controller 100 determines that the change in one or more wheel angle values violate the threshold, the method 500 continues at 518. Alternatively, if the controller 100 determines that the change in one or more wheel angle values do not violate the threshold, the method 500 continues at 520.

At 518, the method 500 takes action responsive to any one of the severity variables being greater than the corresponding thresholds. For example, the controller 100 may take action response to any one of the severity variables being greater than the corresponding thresholds. The controller 100 may take any suitable action, including, but not limited to, apply a brake, alerting the operator of the vehicle 10, alerting a dealer/maintenance entity associated with the vehicle 10, and/or any other suitable action.

In some embodiments, a method for providing a post-event alert includes receiving, from at least one sensor, sensor data, detecting, based on the sensor data, at least one vehicle event, and determining a severity value associated with the at least one vehicle event. The method also includes determining whether the severity value is greater than a severity threshold and, in response to a determination that the severity value is greater than the severity threshold, identifying at least one aspect of a vehicle that is potentially damaged. The method also includes determining a potential damage value associated with the at least one aspect of the vehicle that is potentially damaged, determining whether the potential damage value is greater than a potential damage threshold, and, in response to determining that the potential damage value is greater than the potential damage threshold, generating an alert indicating at least the at least one aspect of the vehicle that is potentially damaged.

In some embodiments, the method also includes providing, to at least one individual associated with the vehicle, the alert. In some embodiments, providing, to the at least one individual associated with the vehicle, the alert includes at least one of providing the alert to a display associated with the vehicle, providing the alert to an electronic mail address associated with the at least one individual associated with the vehicle, and providing the alert to at least one mobile computing device. In some embodiments, the at least one vehicle event is associated with at least one of a pothole, a road bump, a gravel spill, a bridge joint, an access cover, and an asphalt crack. In some embodiments, the method also includes storing, in a database, data associated with the at least one vehicle event. In some embodiments, the method also includes determining, based on data stored in the database, whether a number of vehicle events having characteristics that are similar to the at least one vehicle event is greater than a vehicle event threshold, and in response to a determination that the number of vehicle events having characteristics that are similar to the at least one vehicle event is greater than the vehicle event threshold, initiating at least one corrective action. In some embodiments, the at least one corrective action includes generating an alternative alert.

In some embodiments, a system for providing a post-event alert incudes a processor and a memory. The memory includes instructions that, when executed by the processor, cause the processor to: receive, from at least one sensor, sensor data; detect, based on the sensor data, at least one vehicle event; determine a severity value associated with the at least one vehicle event; determine whether the severity value is greater than a severity threshold; in response to a determination that the severity value is greater than the severity threshold, identify at least one aspect of a vehicle that is potentially damaged; determine a potential damage value associated with the at least one aspect of the vehicle that is potentially damaged; determine whether the potential damage value is greater than a potential damage threshold; and, in response to determining that the potential damage value is greater than the potential damage threshold, generate an alert indicating at least the at least one aspect of the vehicle that is potentially damaged.

In some embodiments, the instructions further cause the processor to provide, to at least one individual associated with the vehicle, the alert. In some embodiments, the instructions further cause the processor to at least one of provide the alert to a display associated with the vehicle, provide the alert to an electronic mail address associated with the at least one individual associated with the vehicle, and provide the alert to at least one mobile computing device. In some embodiments, the at least one vehicle event is associated with at least one of a pothole, a road bump, a gravel spill, a bridge joint, an access cover, and an asphalt crack. In some embodiments, the instructions further cause the processor to store, in a database, data associated with the at least one vehicle event. In some embodiments, the instructions further cause the processor to determine, based on data stored in the database, whether a number of vehicle events having characteristics that are similar to the at least one vehicle event is greater than a vehicle event threshold, and, in response to a determination that the number of vehicle events having characteristics that are similar to the at least one vehicle event is greater than the vehicle event threshold, initiate at least one corrective action. In some embodiments, the at least one corrective action includes generating an alternative alert.

In some embodiments, an apparatus for providing a post-event alert includes a processor, and a memory. The memory includes instructions that, when executed by the processor, cause the processor to: detect, based on sensor data, at least one vehicle event; determine a severity value associated with the at least one vehicle event; determine whether the severity value is greater than a severity threshold; in response to a determination that the severity value is greater than the severity threshold, identify at least one aspect of a vehicle that affected by the at least one vehicle event; determine a value associated with the at least one aspect of the vehicle that is affected by the at least one vehicle event; determine whether the value is greater than a value threshold; in response to determining that the value is greater than the value threshold, generate an alert indicating at least the at least one aspect of the vehicle that is affected by the at least one vehicle event; and provide the alert.

In some embodiments, the instructions further cause the processor to at least one of provide the alert to a display associated with the vehicle, provide the alert to an electronic mail address associated with the at least one individual associated with the vehicle, and provide the alert to at least one mobile computing device. In some embodiments, the at least one vehicle event is associated with at least one of a pothole, a road bump, a gravel spill, a bridge joint, an access cover, and an asphalt crack. In some embodiments, the instructions further cause the processor to store, in a database, data associated with the at least one vehicle event. In some embodiments, the instructions further cause the processor to: determine, based on data stored in the database, whether a number of vehicle events having characteristics that are similar to the at least one vehicle event is greater than a vehicle event threshold; and, in response to a determination that the number of vehicle events having characteristics that are similar to the at least one vehicle event is greater than the vehicle event threshold, initiate at least one corrective action. In some embodiments, the at least one corrective action includes generating an alternative alert.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for providing a post-event alert, the method comprising:

receiving, from at least one sensor, sensor data;

detecting, based on the sensor data, at least one vehicle event;

determining a severity value associated with the at least one vehicle event;

determining whether the severity value is greater than a severity threshold;

receiving at least one steering wheel angle value associated with an angle of a steering wheel corresponding to the at least one vehicle event;

in response to a determination that the severity value is greater than the severity threshold, identifying at least one aspect of a vehicle that is potentially damaged based, at least in part, on the at least one steering wheel angle value;

determining a potential damage value associated with the at least one aspect of the vehicle that is potentially damaged;

determining whether the potential damage value is greater than a potential damage threshold;

in response to determining that the potential damage value is greater than the potential damage threshold, generating an alert indicating at least the at least one aspect of the vehicle that is potentially damaged; and immediately providing, to at least one individual associated with the vehicle, the alert.

2. The method of claim 1, wherein providing, to the at least one individual associated with the vehicle, the alert includes at least one of providing the alert to a display associated with the vehicle, providing the alert to an electronic mail address associated with the at least one individual associated with the vehicle, and providing the alert to at least one mobile computing device.

3. The method of claim 1, wherein the at least one vehicle event is associated with at least one of a pothole, a road bump, a gravel spill, a bridge joint, an access cover, and an asphalt crack.

4. The method of claim 1, further comprising storing, in a database, data associated with the at least one vehicle event.

5. The method of claim 4, further comprising:

determining, based on data stored in the database, whether a number of vehicle events having characteristics that are similar to the at least one vehicle event is greater than a vehicle event threshold; and in response to a determination that the number of vehicle events having characteristics that are similar to the at least one vehicle event is greater than the vehicle event threshold, initiating at least one corrective action.

6. The method of claim 5, wherein the at least one corrective action includes generating an alternative alert.

7. A system for providing a post-event alert, the system comprising:
a processor; and
a memory including instructions that, when executed by the processor, cause the processor to:
receive, from at least one sensor, sensor data;
detect, based on the sensor data, at least one vehicle event;
determine a severity value associated with the at least one vehicle event;
determine whether the severity value is greater than a severity threshold;
receiving at least one steering wheel angle value associated with an angle of a steering wheel corresponding to the at least one vehicle event;
in response to a determination that the severity value is greater than the severity threshold, identify at least one aspect of a vehicle that is potentially damaged based, at least, in part, on the at last one steering wheel angle value;
determine a potential damage value associated with the at least one aspect of the vehicle that is potentially damaged;
determine whether the potential damage value is greater than a potential damage threshold;
in response to determining that the potential damage value is greater than the potential damage threshold, generate an alert indicating at least the at least one aspect of the vehicle that is potentially damaged; and
immediately provide, to at least one individual associated with the vehicle, the alert.

8. The system of claim 7, wherein the instructions further cause the processor to at least one of provide the alert to a display associated with the vehicle, provide the alert to an electronic mail address associated with the at least one individual associated with the vehicle, and provide the alert to at least one mobile computing device.

9. The system of claim 7, wherein the at least one vehicle event is associated with at least one of a pothole, a road bump, a gravel spill, a bridge joint, an access cover, and an asphalt crack.

10. The system of claim 7, wherein the instructions further cause the processor to store, in a database, data associated with the at least one vehicle event.

11. The system of claim 10, wherein the instructions further cause the processor to:
determine, based on data stored in the database, whether a number of vehicle events having characteristics that are similar to the at least one vehicle event is greater than a vehicle event threshold; and
in response to a determination that the number of vehicle events having characteristics that are similar to the at least one vehicle event is greater than the vehicle event threshold, initiate at least one corrective action.

12. The system of claim 11, wherein the at least one corrective action includes generating an alternative alert.

13. An apparatus for providing a post-event alert, the apparatus comprising:
a processor; and
a memory including instructions that, when executed by the processor, cause the processor to:
detect, based on sensor data, at least one vehicle event;
determine a severity value associated with the at least one vehicle event;
determine whether the severity value is greater than a severity threshold;
receive at least one steering wheel angle value associated with an angle of a steering wheel corresponding to the at least one vehicle event;
in response to a determination that the severity value is greater than the severity threshold, identify at least one aspect of a vehicle that is affected by the at least one vehicle event, based, at least in part, on the at least one steering angle value;
determine a value associated with the at least one aspect of the vehicle that is affected by the at least one vehicle event;
determine whether the value is greater than a value threshold;
in response to determining that the value is greater than the value threshold, generate an alert indicating at least the at least one aspect of the vehicle that is affected by the at least one vehicle event; and
immediately provide the alert.

14. The apparatus of claim 13, wherein the instructions further cause the processor to at least one of provide the alert to a display associated with the vehicle, provide the alert to an electronic mail address associated with the at least one individual associated with the vehicle, and provide the alert to at least one mobile computing device.

15. The apparatus of claim 13, wherein the at least one vehicle event is associated with at least one of a pothole, a road bump, a gravel spill, a bridge joint, an access cover, and an asphalt crack.

16. The apparatus of claim 13, wherein the instructions further cause the processor to store, in a database, data associated with the at least one vehicle event.

17. The apparatus of claim 16, wherein the instructions further cause the processor to:
determine, based on data stored in the database, whether a number of vehicle events having characteristics that are similar to the at least one vehicle event is greater than a vehicle event threshold; and
in response to a determination that the number of vehicle events having characteristics that are similar to the at least one vehicle event is greater than the vehicle event threshold, initiate at least one corrective action.

18. The apparatus of claim 17, wherein the at least one corrective action includes generating an alternative alert.

* * * * *